United States Patent [19]

Hill et al.

[11] 4,003,982
[45] Jan. 18, 1977

[54] SAFE METHOD FOR THERMAL DECOMPOSITION OF NITROGEN TRICHLORIDE

[75] Inventors: Howard W. Hill, Sea Ranch; Ronald E. Hassall, Antioch, both of Calif.

[73] Assignee: The Dow Chemical Company, Midland, Mich.

[22] Filed: Apr. 30, 1975

[21] Appl. No.: 573,224

[52] U.S. Cl. .............................. 423/351; 423/235; 423/406; 423/500; 260/248 C
[51] Int. Cl.² ..................... C01B 21/02; C01B 7/03
[58] Field of Search .......... 423/235, 351, 500, 406; 260/248 C

[56] References Cited
UNITED STATES PATENTS 2,692,818  10/1954  Bewick .............................. 423/500

OTHER PUBLICATIONS

Mellor, "A Comprehensive Treatise on Inorganic & Theoretical Chemistry," Longmans, Green & Co., New York, vol. 8, p. 601, 1928.

Primary Examiner—Earl C. Thomas
Attorney, Agent, or Firm—Robert R. Stringham

[57] ABSTRACT

Nitrogen trichloride normally explodes when heated to 95° C. However, when a dilute solution of $NCl_3$ in an inert solvent is heated to a temperature in the range of 105°–140°, controlled decomposition to nitrogen and chlorine results. Nitrogen is innocuous and can be vented to the atmosphere. The chlorine is recovered. This method of $NCl_3$ disposal is uncomplicated and non-polluting and constitutes a distinct improvement over prior art methods. The process of the invention finds utility primarily in destroying nitrogen trichloride formed as a by-product in the manufacture of trichloro isocyanuric acid.

13 Claims, No Drawings

SAFE METHOD FOR THERMAL DECOMPOSITION OF NITROGEN TRICHLORIDE

BACKGROUND OF THE INVENTION

Safe disposal of by-prodcut nitgrogen trichloride ($NCl_3$) has long been a problem in the manufacture of trichloroisocyanuric acid. $NCl_3$ is generally present, to an extent dependent on cyanuric acid chlorination process details, in the vent gas from the reactor. Such vent gases usually include nitrogen, carbon dioxide, chlorine and water vapor. Both environmental and economic reasons dictate the recovery of chlorine from these vent gases. However, the $NCl_3$ must first be removed to prevent accumulations of dangerous concentrations of $NCl_3$ as a result of repeated reuse (recycling) of the recovered chlorine. Additionally, $NCl_3$ may remain in the liquid (slurry) reactor effluent, in which case it tends to be driven off during subsequent solids drying operations.

$NCl_3$ is usually removed from gas streams by contacting them with concentrated hydrochloric acid, which converts the $NCl_3$ to ammonium chloride. The latter product is soluble and constitutes a disposal problem which is generally handled by base treatment to liberate ammonia and form a chloride brine.

U.S. Pat. No. 3,184,458, for example, teaches that $NCl_3$ can be removed from recycle chlorine and inert stripping gases by scrubbing with acid. However, disposal of the used acid by sewering is taught and this is now recognized as environmentally unsuitable. The patent also teaches periodic rinsing of lines and equipment with mild reducing agents, such as sodium nitrite or sulfite, to decompose accumulated $NCl_3$. This introduces further waste disposal problems.

Other patents representative of the prior art methods of dealing with nitrogen trichloride are U.S. Pat. No. 2,969,360; 2,770,998; 3,035,056; 3,474,096; 3,534,033; 3,568,409; 3,597,156; 3,668,204 and Belgian Patent No. 644,209.

The present applicants have found nothing in the published literature suggesting that thermal decomposition has ever been considered as a feasible or desirable method for disposal of $NCl_3$.

OBJECTS OF THE INVENTION

It is a primary object of the present invention to provide an environmentally acceptable process for nitrogen trichloride disposal.

Another object of the present invention is to provide a safe and efficient method of preventing nitrogen trichloride build-ups in recycled chlorine or inert stripping gases recovered or formed during trichloroisocyanuric acid manufacture.

A particular object is to provide a method of $NCl_3$ decomposition which is well suited to the prevention of $NCl_3$ accumulation in solvent recycled in the process for the manufacture of trichloroisocyanuric acid which is disclosed in pending U.S. Pat. Application Ser. No. 485,872, filed July 5, 1974, wherein an aqueous solution of a trialkali metal cyanurate is reacted with an excess of chlorine in the presence of an essentially water immiscible solvent for the resulting chlorinated acid (trichlorotriazenetrione).

A further object is to provide an improved method of purging process lines of $NCl_3$ in conventional (2-phase) trichloroisocyanuric acid manufacturing plants or removing $NCl_3$ from aqueous recycle streams therein.

SUMMARY DESCRIPTION

The present invention is a process for decomposing nitrogen trichloride to nitrogen and chlorine which comprises heating a solution of not more than about 3.5 weight percent $NCl_3$ in an inert solvent, under at least autogenous pressure, to a temperature within the range of from about 105° C. to that resulting in an autogenous pressure of 300 psig.

As used herein, the term "autogenous pressure" means the pressure resulting from containment of the reaction mixture in a vessel not operatively connected to an external source of pressure.

Ordinarily, temperatures above about 140° C. will not be employed. Preferably, the temperature is within the range of from about 120°–130° C. Optimally, the temperature is with the range of about 124°–126° C.

The process may be carried out either as a batch operation, as a semi-continuous operation or in a true, continuous-flow mode. In batch operation, $NCl_3$ concentrations in excess of 2 weight percent should ordinarily be avoided.

In a preferred mode of operation, the $NCl_3$ solution is maintained at the selected reaction temperature until at least half the $NCl_3$ has been decomposed.

Although otherwise suitable, water-miscible solvents may be used in the present process, water-immiscible solvents are highly preferred. Mixed solvents may of course be employed.

DETAILED DESCRIPTION OF THE INVENTION

The term inert solvent, as used herein, is meant to denote a liquid which is a solvent for $NCl_3$ an does not react with $NCl_3$, chlorine or any other material present, to an intolerable extent under the conditions to be employed. What constitutes a tolerable extent of reaction will depend on the equipment used, the mode of operation and the circumstances under which the process is being practiced. In general, however, the most important criterion will be the extent to which the vapor pressure exerted by the mixture is increased as a consequence of $N_2$ evolution and any heat evolution which may occur. Pressures in excess of about 300 psig require heavy duty, expensive equipment. An additional criterion is the utility and ease of separation of any products formed by reaction with the solvent. Since the $NCl_3$ decomposition itself is thermodynamically irreversible under the conditions employed, no equilibrium is involved and the decomposition is not driven by "reacting out" any chlorine initially present with the $NCl_3$ or formed by the decomposition reaction. In general, it will be highly preferable to use a solvent which does not react at a detectable rate with any of the other chemicals present, under the conditions to be employed.

Exemplary inert, water-immiscible solvents are carbon tetrachloride, methylene chloride, ethylene dichloride and benzene. The latter three solvents are preferred, despite the necessity for limiting $NCl_3$ concentrations therein to 2% or less, by reason of their particular suitability for use in the process of the aforesaid pending application Ser. No. 485,872.

The dilute $NCl_3$ solution to be decomposed may originate as a process stream or may be formed otherwise, as - for example - by passing an $NCl_3$-containing gas through a sufficiently large volume of a solvent, selective for $NCl_3$, under appropriate conditions of temperature and pressure and in an appropriate contactor, such as - for example - a conventional gas scrubber.

The method of the present invention may be employed to advantage in conventional trichloroisocyanuric acid plants, wherein $NCl_3$ tends to accumulate in various portions of the process system in which stagnation or entrapment may occur. The reaction system, or any portion thereof - including transfer lines, vessels, pumps, etc. - in such a plant may be purged by circulating a solvent, such as, for example, ethylene dichloride therethrough to take up any $NCl_3$ and form a dilute solution which can then be heated to effect decomposition of the $NCl_3$.

Most suitably, the present method of $NCl_3$ decomposition is practised with solutions thereof produced by the process above referred to wherein an aqueous trialkalimetal cyanurate solution is reacted with chlorine in the presence of a water-immiscible solvent for trichloroisocyanuric acid. The organic phase in the resulting reaction mixture contains the trichloroisocyanuric acid product, excess chlorine and $NCl_3$ in low concentration. The "acid" (trichlorotrazinone) is recovered, as by chilling and filtering or by evaporating off (and condensing) the solvent (together with the chlorine and nitrogen trichloride). The resulting mother liquor or condensate constitutes a dilute $NCl_3$ solution which also contains chlorine. This solution is heated to decompose the $NCl_3$ and the pressure is maintained - by bleeding off evolved $N_2$ gas as necessary - at a level sufficient to prevent substantial volatilization of chlorine and/or solvent. The solution is then cooled at least to the requisite process temperature and recycled to the chlorination step.

Similarly, an aqueous recycle stream, such as an aqueous mother liquor obtained by filtering out the trichloroisocyanuric acid product in a conventional plant for making the same, may be intimately contacted with a solvent suitable for the practice of the present invention. Any trichloroisocyanuric acid co-extracted with the $NCl_3$ can be separated by such procedures, for example, as chilling and filtering, before heating to effect $NCl_3$ decomposition is carried out.

Suitable pressures for the practice of the present process are as required to prevent substantial volatilization of chlorine and/or solvent from the reaction (decomposition) mixture at the maximum temperature reached in the reactor. The preferred and most preferred pressure ranges are from about 50 to about 250 psig and from about 75 to about 150 psig, respectively. As a guide, the vapor pressures of chlorine and typical suitable solvents are tabulated below.

| Material | Temperature (° C.)/Vapor Pressure (atm.) | |
|---|---|---|
| Chlorine | 102°/40 atm. | 127°/60 atm |
| $CCl_4$ | 102/2 | 124/5 |
| $CH_2Cl_2$ | 100/5.7 | 140/13.2 |
| $FCCl_3$ | 108/10 | 147/20 |
| $CHCl_3$ | 120/5 | 152/10 |
| 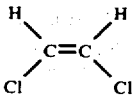 | 119/5 | 152/10 |
| 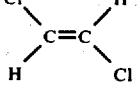 | 104/5 | 136/10 |
| $HCl_2C-CH_3$ | 117/5 | 150/10 |

-continued

| Material | Temperature (° C.)/Vapor Pressure (atm.) | |
|---|---|---|
| $H_2ClC-CH_2Cl$ | 108/2 | 148/5 |
| $C_2H_5Cl$ | 93/10 | 127/20 |
| Pentane | 92/5 | 125/10 |
| Chlorobenzene | 132/1 | 160/2 |
| Fluorobenzene | 110/2 | 149/5 |
| Benzene | 104/2 | 143/5 |
| Cyclohexane | 106/2 | 146/5 |
| Heptane | 125/2 | 166/5 |

Since the mole fraction of chlorine present will usually be less than about 0.05, the partial pressure exerted by chlorine will generally not exceed about 3 atmospheres (about 42 psig). Also, it is apparent from the preceding tabulation that solvent partial pressures in excess of about 7 atmospheres will not ordinarily be exerted. Total autogenous pressures of about 10 atmospheres (about 140 psig) or less can then be anticipated. Since nitrogen is essentially insoluble in the types of solvents that will generally be employed and exerts a considerable vapor pressure (20 atmospheres at a temperature of -158° C., for example), the nitrogen evolved by decomposition of even quite dilute (~1-2%) $NCl_3$ solutions will ordinarily suffice to repress solvent and/or chlorine volatilization.

Temperatures below about 150° necessitate excessively large reactors in order to attain a practicable absolute conversion rate and are thus unlikely to be employed. On the other hand, reaction temperatures above about 135° C. should not be employed with solvents which contain potentially replaceable hydrogens. Temperatures above 135° C. may be used with solvents - $CCl_4$, for example, which are unreactive with $NCl_3$ and chlorine. In the latter case, upper limits on temperature are imposed by the need for equipment able to withstand the pressures developed. Operation at working pressures in excess of about 300 psig will generally require excessive capital investment. The decomposition is quite rapid at 140°. Higher temperatures are therefore unnecessary and, in fact, should generally be avoided as being more conducive to undesired reactions with the solvent employed.

The permissible maximum concentration of $NCl_3$ in the solution to be heated is dependent on several factors. If a solvent which is ordinarily unreactive with chlorine, $CCl_4$ for example, is employed, the only source of heat evolution is the $NCl_3$ decomposition reaction itself (the heat of formation of $NCl_3$ is about +55 K Cal/16 mole) and $NCl_3$ concentrations as high as about 3.5 weight percent are permissible. No reaction should occur between chlorine (or $NCl_3$) and solvents such as chloroform, hexane or benzene which contain replaceable hydrogens, so long as conditions conducive to free radical generation are avoided. However, safety considerations require that $NCl_3$ concentrations in such solvents be low enough (not in excess of about 2 weight percent) so that any reaction which does occur between chlorine (originally present as such and/or derived from $NCl_3$ decomposition) can be accommodated without excessive temperature (and vapor pressure) increases. As a further precaution, a continuous-flow mode of operation is preferred for $NCl_3$ concentrations in excess of about 2 weight percent, regardless of the type of solvent used. In the latter mode of operation, heat removal is more readily accomplished and the possibility of localized overheating is essentially eliminated.

The concentration of chlorine in a given solution can readily be determined by any of several known methods. $NCl_3$ concentrations may be determined by ultraviolet absorption spectrophotometry (Anal. Chem., 33, No. 6, p. 705 (1961) ).

The decomposition may be carried out as an adiabatic process or heat may be removed from the reaction mixture, as, for example, by use of conventional heat exchanger equipment. The temperature (and vapor pressure ) rise which will result when a given amount of $NCl_3$ is decomposed in a given volume of a solvent, starting at a given initial temperature (at least about 105° C.), can readily be estimated by methods of calculation well known to chemical engineers. Similarly, the effects of any (unexpected) reaction between the solvent and chlorine can be calculated and allowed for in the design of equipment such as relief valves, pressure rise sensors and emergency cooling means. As a general guide, however, the total heat evolved for decomposition of a 2 weight percent solution of $NCl_3$ may be increased by as much as about 90% if the liberated chlorine should react with the solvent. The additional heat which could be liberated by reaction of chlorine initially present as such in the solution will be proportionate.

Suitable residence times are of course dependent on the temperature employed and the degree of $NCl_3$ decomposition required. For example, at a temperature of 125° C., 90% of the $NCl_3$ originally present will have decomposed after 36 seconds. At 110°, the same extent of decomposition will require a residence time of about 108 seconds and a correspondingly greater reactor volume will be required to decompose the same total lbs./hr. of $NCl_3$. Complete decomposition will often be unnecessary. In fact, in an operation where the heated solution is to be recycled, it may suffice to decompose just enough of the $NCl_3$ to maintain the content in the effluent to be treated below some preselected level, such as about 1%. However, it will generally be preferable to maintain the $NCl_3$ solution at the selected reaction temperature until at least 50% of the $NCl_3$ originally present has been decomposed.

EXAMPLES

EXAMPLE 1

Six cylindrical glass ampoules, each 10 mm OD × 8 mm ID, were charged with 9 ml. of a solution of 0.1% $NCl_3$ in $CCl_4$ and 0.1 ml. water and were flame sealed at a height of 24 cm. The ampoules were thus approximately 75 % liquid filled.

Using adequate shielding, the ampoules were lowered rapidly into a stirred ethylene glycol bath heated and controlled at 125° C. After a scheduled time interval each ampoule was removed from the hot bath and placed in ice water. Analyses showed that no $NCl_3$ could be detected after 120 seconds in the hot bath. After 60 seconds, there was a residual of 17 ppm $NCl_3$ and after 30 seconds 123 ppm $NCl_3$ remained.

EXAMPLE 2

In a similar experiment with a bath temperature of 110° C., residual $NCl_3$ contents after successively longer residence times in the hot bath were as follows:

| Time - Seconds | PPM $NCl_3$ |
|---|---|
| 0 | 1006 |
| 30 | 597 |
| 60 | 190 |
| 90 | 111 |
| 120 | 97 |
| 180 | 58 |
| 240 | 18 |

EXAMPLE 3

In a preferred mode of operation (continuous flow), advantage is taken of the exothermicity of the decomposition to minimize heating requirements. The incoming feed to the decomposer is pumped through a heat exchanger in countercurrent flow to the solution exiting from the decomposer. Thereby, the heat evolved in the decomposition of the $NCl_3$ in a given volume of the solution is utilized to raise the temperature of a following volume of the solution to a temperature sufficient to initiate decomposition.

In a typical such operation, a flow of 10,000 lbs. per hour of ethylene dichloride containing 100 lbs. of chlorine, 10 pounds of $NCl_3$ and 20 pounds of water is introduced, at a temperature of 30° C., to the heat exchanger and passed therethrough countercurrent to the stream of treated solution exiting from the decomposer at a temperature of 125° C. The heated feed solution is introduced to the decomposer, together with sufficient 150 psig steam to raise the entry temperature to 100° C. The effluent flowing from the decomposer to the heat exchanger consists of 10,000 lbs./hr. of ethylene dichloride, 108 lbs. of chlorine, 1 lb. of $NCl_3$, 1 lb. of $N_2$ gas and 127 lbs. of water. On exiting from the heat exchanger, this effluent is at a temperature of 55° C. and exerts a vapor pressure of about 4 atmospheres.

If the content of $NCl_3$ in the feed solution is increased to 1.75 weight percent, the heat of reaction in the decomposer alone suffices to establish an exit temperature of 125° C. and no steam input is required.

We claim:
1. The process for decomposing nitrogen trichloride to nitrogen and chlorine which comprises heating a solution of not more than about 3.5 weight percent $NCl_3$ in an inert solvent, under at least autogenous pressure, to a temperature within the range of from about 105° C. to that resulting in an autogenous pressure of 300 psig.
2. The process of claim 1 in which the solvent is water-immiscible.
3. The process of claim 2 in which the solvent is carbon tetrachloride, methylene chloride, ethylene dichloride, benzene or mixtures thereof.
4. The process of claim 1 in which the solvent contains hydrogens potentially replaceable with chlorine and the $NCl_3$ concentration is not in excess of about 2 weight percent.
5. The process of claim 1, wherein the $NCl_3$ concentration is about 2 weight percent or less and the decomposition is carried out as a batch reaction.
6. The process of claim 1 wherein the $NCl_3$ concentration is greater than about 2 weight percent and the decomposition is carried out in a continuous flow mode.
7. The process of claim 1 wherein the temperature is within the range of from about 120°–130° C.

8. The process of claim 1 wherein said solution additionally contains chlorine and the mole fraction of chlorine therein is 0.05 or less.

9. The process of claim 1 wherein said solution is a mother liquor or condensate derived from a solution of trichloroisocyanuric acid produced by the reaction of chlorine in excess with an aqueous trialkalimetal cyanurate solution in the presence of said solvent.

10. The process of claim 9 wherein the solution of chlorine in said solvent formed upon said heating is recycled to said reaction of chlorine with an aqueous trialkalimetal cyanurate solution.

11. The process of claim 8 wherein the solvent is ethylene dichloride, the temperature is within the range of 124°–126° and the heating is continued until at least half the $NCl_3$ originally present has been decomposed.

12. The process of claim 1 wherein said solution is formed by flowing said solvent through any portion of a reaction system for the production of trichloroisocyanuric acid by the chlorination of a trialkalimetal salt in aqueous solution or suspension.

13. The process of claim 1 wherein said solution is formed by a procedure comprising intimately contacting said solvent with an aqueous mother liquor from which trichloroisocyanuric acid has been separated.

* * * * *